US009461458B2

(12) United States Patent
Balcerek et al.

(10) Patent No.: US 9,461,458 B2
(45) Date of Patent: Oct. 4, 2016

(54) METHOD OF DISTANCE PROTECTION OF PARALLEL TRANSMISSION LINE

(75) Inventors: Przemyslaw Balcerek, Cracow (PL); Murari Saha, Vasteras (SE); Eugeniusz Rosolowski, Wroclaw (PL); Jan Izykowski, Wroclaw (PL); Piotr Pierz, Wroclaw (PL)

(73) Assignee: ABB TECHNOLOGY AG, Zurich (CH)

(*) Notice: Subject to any disclaimer, the term of this patent is extended or adjusted under 35 U.S.C. 154(b) by 363 days.

(21) Appl. No.: 14/238,543

(22) PCT Filed: Aug. 6, 2012

(86) PCT No.: PCT/EP2012/003353
§ 371 (c)(1),
(2), (4) Date: Feb. 12, 2014

(87) PCT Pub. No.: WO2013/023753
PCT Pub. Date: Feb. 21, 2013

(65) Prior Publication Data
US 2014/0200726 A1    Jul. 17, 2014

(30) Foreign Application Priority Data
Aug. 16, 2011    (EP) .................................... 11460043

(51) Int. Cl.
*H02H 3/42* (2006.01)
*H02H 3/36* (2006.01)
(Continued)

(52) U.S. Cl.
CPC ............... *H02H 3/16* (2013.01); *H02H 7/267* (2013.01); *H02H 3/42* (2013.01)

(58) Field of Classification Search
CPC .... H02H 3/006; H02H 3/05; H02J 2003/001

USPC ......................................................... 700/292
See application file for complete search history.

(56) References Cited

U.S. PATENT DOCUMENTS 4,896,241 A    1/1990   Li et al. ............................ 361/66
5,367,426 A   11/1994   Schweitzer, III ............... 361/80
(Continued)

FOREIGN PATENT DOCUMENTS

EP    2 544 014 A1    1/2013    ............. G01R 31/08
EP    2 544 322 A1    1/2013    ............... H02H 7/26

OTHER PUBLICATIONS

International Search Report mailed Mar. 5, 2013 in corresponding application No. PCT/EP2012/003353.
(Continued)

*Primary Examiner* — Robert Fennema
*Assistant Examiner* — Jigneshkumar Patel

(57) ABSTRACT

The present invention is concerned with a method of distance protection of parallel transmission lines applicable both to series compensated and uncompensated electric power lines, using a distance relay. The method is characterized in that a pair of flags ($ff_1$, $ff_2$) are calculated for indication faulted and healthy circuits in parallel lines and in the same time a flag (Internal_Fault) for indication internal or external fault in parallel lines is calculated independently. Next gathering all calculated flags ($ff_1$, $ff_2$, Internal_Fault) an analyze of the value of these flags are performed and depending on the values of flags ($ff_1$, $ff_2$, Internal_Fault) and on their reciprocal relationship, a trip permission signal from the protection relay (4) is released and sent to the alarms devices or to the line breakers, or a block signal from the protection relay (4) is generated and sent to protect parallel lines before damage.

1 Claim, 2 Drawing Sheets

(51) Int. Cl.
H02H 7/26 (2006.01)
H02H 3/16 (2006.01)

(56) References Cited

U.S. PATENT DOCUMENTS

| | | | |
|---|---|---|---|
| 5,796,258 A | 8/1998 | Yang | 324/522 |
| 5,956,220 A | 9/1999 | Novosel et al. | 361/62 |
| 6,336,059 B1* | 1/2002 | Novosel | H02H 3/40 |
| | | | 361/16 |

OTHER PUBLICATIONS

Written Opinion mailed Sep. 23, 2013 in corresponding application No. PCT/EP2012/003353.

Zhang et al.; *Fault Location of Two-parallel Transmission Line for Non-earth Fault Using One-terminal Data*; IEEE Transactions on Power Delivery; IEEE Service Center, New York, NY USA, vol. 14, No. 3; Jul. 1, 1999.

Osman et al.; *Experimental test results for a parallel transmission lines protection scheme using wavelet transform*; IEE Proceedings: Generation, Transmission and Distribution, Institution of Electrical Engineers; Great Britain; Nov. 12, 2004; vol. 151, No. 6; pp. 713-720.

Saha et al., *Adaptive Distance Protection for Series Compensated Transmission Lines*; $29^{th}$ Annual Western Protective Relay Conference; Spokane, WA; Oct. 22-24, 2002.

* cited by examiner

METHOD OF DISTANCE PROTECTION OF PARALLEL TRANSMISSION LINE

CROSS-REFERENCE TO RELATED APPLICATION

This is a §371 application of International patent application number PCT/EP2012/003353 filed Aug. 6, 2012, which claims the benefit of European patent application No. 11460043.0 filed on Aug. 16, 2011, and which are incorporated herein by reference.

TECHNICAL FIELD

The present invention is concerned with a method of distance protection of parallel transmission lines applicable both to series compensated and uncompensated electric power lines, using a distance relay. The method fits for use in the power industry for overhead transmission lines. Fast and distance protection of parallel transmission lines is of great importance both for power companies dealing with electric energy distribution and for end users of electric energy. Quick and reliable distance protection affects the quality of power system protection.

BACKGROUND ART

A distance relay responds to line voltage and current inputs signals as a function of the line circuit distance between the relay location and a point of faults and determines whether a faults exist within or outside the relay operating characteristic zone between terminal A and B. The major advantage of distance relay is that the relay's operation zone is a function of the protected line circuit impedance, which is a fixed constant and relatively independent of current and voltage magnitudes. Thus the distance relay has a fixed reach. Generally if the line circuit impedance of the protected line between terminal L and R equals ZL then the relay operating zone characteristic ZI, common known as first zone, are reduces to the 70-85% of the line circuit impedance ZL with additional consideration of the remote side source impedance and fault resistance influence. As a results of that, the relay zone operation characteristic at the impedance plane is determined.

Series compensation SC is applied to worldwide EHV— Extra High Voltage transmission lines where long transmission distance and large power transmission are involved. It is an effective and economic means of increasing power transmission capability, improving power system stability, reducing transmission losses, enhancing voltage control and flexible power flow control. However, protection of such kind of line still causes problems especially for parallel lines. This is due to the fact that series capacitors shift the fault-loop impedances which results in tripping the healthy line. If the fault current and parallel circuit current flow in the same direction, the apparent impedance will be overestimated and the distance relay will underreach. On the other hand, if the fault current and the parallel circuit current flow in opposite directions, the apparent impedance will be underestimated and the distance relay will overreach. The common practice is to set each relay's reach on the basis of the predicted worst case system conditions for the particular pilot or non-pilot protection scheme in use. As a results of that considerable shortening of the first zone reach to 30-40% instead of 70-85% is applied.

An example of the distance protection relay is described in U.S. Pat. No. 5,367,426. This application based on the positive sequence impedance determination. In this solution calculated impedance converted in to magnitude angle representation are compared against load pattern and test pattern. The trip signal is send if the calculated impedance is within the test pattern.

An example of a protective relay that utilizes a parallel circuit's current in conjunctions with measurements of voltage and current on the protected line is described in U.S. Pat. No. 5,956,220. In this solution the current ratio for negative or zero sequences is used to avoid incorrect compensation of mutual coupling effect for the relays on the healthy circuit.

From patent description U.S. Pat. No. 5,796,258 are known a method and apparatus for monitoring at least one electric power transmission line for a fault condition within a predetermined distance from a measuring location. This patent describes a quadrilateral characteristic relay system for determining fault and adapts under-reach and over-reach relay characteristics.

The other protective relay system is known from patent description U.S. Pat. No. 4,896,241. The solution according to the patent describes a directional comparison relaying system including forward looking pilot relays at each terminal of a protected line segment. This is dependent on communication between different ends.

The article "Fault Location of Two-parallel Transmission Line for Non-earth Fault Using One-terminal Data"—IEEE TRANSACTIONS ON POWER DELIVERY, IEEE SERVICE CENTER, NEW YORK, US, vol. 14, no. 3, 1 Jul. 1999 (Zhang Qingchao et all) describes a fault location algorithm on parallel transmission line utilizing the local data which are three voltages and six currents. It needs line parameters data for the parallel lines. This is needed in order to eliminate the effect of remote-end in fault location calculation. The invented idea is also utilizing only local end measurements but line parameters are not needed in basic calculation. The invented idea is dedicated to other form of application.

The Article "Experimental test results for a parallel transmission lines protection scheme using wavelet transform"— IEE PROCEEDINGS: GENERATION, TRANSMISSION AND DISTRIBUTION, INSTITUTION OF ELECTRICAL ENGINEERS, GB, vol. 151, no. 6, 12 Nov. 2004, describes a scheme for the protection of parallel lines using wavelet transformer. This utilizes measurements of both current and voltage at line ends. On other hand, the invented idea is utilizing only local end information. Thus the concept of the article differs to that described in invented patent application.

Another example of the distance protection scheme is presented in the publication "Adaptive Distance Protection for Series Compensated Transmission Lines" presented at 29th Annual Western Protective Relay Conference Spokane, Wash., Oct. 22-24, 2002. In this publication in order to maintain correct directional discrimination in case of voltage reversal, a polarization function is added to the main distance protection. The polarization voltage is based on healthy phase and memorized voltage. Additionally directional determination for high-speed ground fault detection is done with utilizing superimposed currents and polarizing voltages during a short interval after the fault inception. This makes it possible to extend the reach of the first zone regardless of the capacitor presence in the fault loop, since the apparent reactance changes slowly. The presented protection scheme consists of the main distance protection, a fast tripping algorithm for multi-phase faults and a fast tripping algorithm for single phase to ground faults.

In the patent application EP11460034.9 filed by applicant, a method of selecting between internal and external faults in parallel lines using one-end measurements is presented. This method is designated for determination whether detected fault is placed on a protected parallel lines or outside the lines. This method used measurement of current signals at one end of the line in terminal A or in terminal B. In this solution current signals are processed, pre-fault and fault current signals and the zero-sequence current signal are determined, and current phasors are calculated. Then symmetrical scaling coefficient $k_{prefault}$ establishing a reciprocal relation between the currents of a single line of the parallel lines is determined in order to calculate corrected fault current phasors after scaling and current differences sum sdi1, sdi01, sdi2, sdi02 for each line. Then having the current differences sum sdi1, sdi01, sdi2, sdi02 for each line, the maximum sdi_max, sdi_0max and the minimum sdi_min, sdi_0min of the sum of the current differences are determined. Finally flag Internal_Fault having the conventional value of one for an internal fault within the parallel lines or zero value for an external fault outside the parallel lines is identified, or no fault conditions is identified according to the following formula:

$$\text{Internal\_Fault}(n) = \begin{cases} 1 \text{ when} & \begin{cases} \frac{\text{sdi\_max}(n)}{\text{sdi\_min}(n)} > sdi_{thr} \text{ AND FAULT\_Ph} - Ph(n) = 1 \\ \text{OR} \\ \frac{\text{sdi\_0max}(n)}{\text{sdi\_0min}(n)} > sdi_{thr} \text{ AND FAULT\_Ph} - G(n) = 1 \end{cases} \\ 0 \text{ otherwise} \end{cases}$$

where:
$sdi_{thr}$—is a different current sum coefficient threshold given by the user,
n—is the real consecutive number of the present digital sample processed by the protective device,
FAULT_Ph-G(n) is a fault type coefficient indicating phase-to-ground faults,
FAULT_Ph-Ph(n) is a fault type coefficient indicating phase-to-phase fault.

In the patent application EP11460033.1 filed by applicant, a method of selecting between faulted and healthy circuits in parallel lines using one-end measurements is described. This method is designated for determination whether detected fault is placed on a protected circuit of the parallel lines or on parallel circuit. The input signals in those methods are samples of three-phase currents from both circuits of the parallel lines. In this solution current signals are processed, pre-fault and fault current signals and the zero-sequence current signal are determined, and current phasors are calculated. Then symmetrical scaling coefficient $k_{prefault}$ establishing a reciprocal relation between the currents of a single line of the parallel lines is determined in order to calculate corrected fault current phasors after scaling and current differences sum for each line sdi1, sdi01, sdi2, sdi02. Then having the current differences sum for each line fault, coefficients $ff_1$, $f_{o1}$, $f_2$, $f_{o2}$ are calculated. Next flags ff1 and ff2 having a conventional value of one or zero in order to carry out the selection of faulted and healthy circuits in the parallel lines are determined according to the following formulas:

$$ff_1(n) \begin{cases} 1 \text{ when} & \begin{cases} f_1(n) \geq f_{thr} \text{ AND FAULT\_Ph} - Ph_1(n) = 1 \\ \text{OR} \\ f_{o1}(n) \geq f_{thr} \text{ AND FAULT\_Ph} - G_1(n) = 1 \end{cases} \\ 0 \text{ otherwise} \end{cases}$$

for line circuit #1 which is the protected line,
and $$ff_2(n) \begin{cases} 1 \text{ when} & \begin{cases} f_2(n) \geq f_{thr} \text{ AND FAULT\_Ph} - Ph_2(n) = 1 \\ \text{OR} \\ f_{o2}(n) \geq f_{thr} \text{ AND FAULT\_Ph} - G_2(n) = 1 \end{cases} \\ 0 \text{ otherwise} \end{cases}$$

for line circuit #2
where:
$f_{thr}$—is threshold for fault coefficients $ff_1$, $f_{o1}$, $f_2$, $f_{o2}$ given by user,
FAULT_Ph-$G_1$(n) is a fault type coefficient indicating phase-to-ground faults and in the line #1,
FAULT_Ph-$Ph_1$(n) is a fault type coefficient indicating phase-to-phase fault in the line #1 or non-fault conditions,
FAULT_Ph-$G_2$(n) is a fault type coefficient indicating phase-to-ground faults and in the line #2,
FAULT_Ph-$Ph_2$(n) is a fault type coefficient indicating a phase-to-phase fault in the line #2 or non-fault conditions.
Next the selection of faulted and healthy circuits in parallel lines is performed in the following actions.
First it is checked if only one of the coefficients ff1 or ff2 equals one, and if:
 ff1(n)=1 AND ff2(n)=1 then ff1(n)=0 AND ff2(n)=0,
or
 ff1(n)=0 AND ff2(n)=0,
it means that the outside fault of the parallel lines has been identified.
Next the relation between the value of the coefficients ff1 and ff2 is checked, and if
 ff1(n)=1 AND ff2(n)=0,
it means that internal fault within line circuit #1 of the parallel lines has been identified;
or if
 ff1(n)=0 AND ff2(n)=1,
it means that internal fault within line circuit #2 of the parallel lines has been identified.

SUMMARY OF THE INVENTION

An essence of a method of distance protection of parallel transmission lines comprises measuring current and voltages signals from the individual phases A, B, C from both line circuit #1 and line circuit #2 of the parallel lines and optional zero sequence currents of both line circuit #1 and line circuit #2 of the parallel lines, processing the measured signals and using a protection relay and calculating a coefficient FAULT_Ph-$G_1$(n) which indicating phase-to-ground faults in the line circuit #1, a coefficient FAULT_Ph-$Ph_1$(n) which indicating a phase-to-phase fault in the line circuit #1, a coefficient FAULT_Ph-$G_2$(n) which indicating phase-to-ground faults in the line circuit #2, a coefficient FAULT_Ph-$Ph_2$(n) which indicating a phase-to-phase fault in the line circuit #2, and
next calculating a pair of a flags ($ff_1$, $ff_2$) for indication faulted and healthy circuits in parallel lines, where the flag $ff_1$ for line circuit #1 is calculated according to the following formula:

$$ff_1(n) \begin{cases} 1 \text{ when} & \begin{Bmatrix} f_1(n) \geq f_{thr} \text{ AND FAULT\_Ph-}Ph_1(n) = 1 \\ \text{OR} \\ f_{01}(n) \geq f_{thr} \text{ AND FAULT\_Ph-}G_1(n) = 1 \end{Bmatrix} \\ 0 \text{ otherwise} \end{cases}$$

and where the flag $ff_2$ for line circuit #2 is calculated according to the following formula:

$$ff_2(n) \begin{cases} 1 \text{ when} & \begin{Bmatrix} f_2(n) \geq f_{thr} \text{ AND FAULT\_Ph-}Ph_2(n) = 1 \\ \text{OR} \\ f_{02}(n) \geq f_{thr} \text{ AND FAULT\_Ph-}G_2(n) = 1 \end{Bmatrix} \\ 0 \text{ otherwise} \end{cases}$$

where:
$f_{thr}$—is a threshold for fault coefficients $f_1$, $f_{01}$, $f_2$, $f_{02}$ given by user,
n—is the real consecutive number of the present digital sample processed by the protective device,
FAULT_Ph-$G_1$(n) is a fault type coefficient indicating phase-to-ground faults in the line circuit #1,
FAULT_Ph-$Ph_1$ (n) is a fault type coefficient indicating phase-to-phase fault in the line circuit #1 or non-fault conditions,
FAULT_Ph-$G_2$(n) is a fault type coefficient indicating phase-to-ground faults in the line circuit #2,
FAULT_Ph-$Ph_2$(n) is a fault type coefficient indicating a phase-to-phase fault in the line circuit #2 or non-fault conditions.

Next calculating a flag Internal_Fault for indication internal or external fault in parallel lines in independent way according to the formula:

$$\text{Internal\_Fault}(n) = \begin{cases} 1 \text{ when} & \begin{Bmatrix} \frac{sdi\_max(n)}{sdi\_min(n)} > sdi_{thr} \text{ AND FAULT\_Ph-}Ph(n) = 1 \\ \text{OR} \\ \frac{sdi\_0max(n)}{sdi\_0min(n)} > sdi_{thr} \text{ AND FAULT\_Ph-}G(n) = 1 \end{Bmatrix} \\ 0 \text{ otherwise} \end{cases}$$

where:
$sdi_{thr}$—is a different current sum coefficient threshold given by the user,
sdi_max(n), sdi_0max(n)—are maximum values of the sum of the current differences,
sdi_min(n), sdi_0min(n)—are minimum values of the sum of the current differences,
n—is the real consecutive number of the present digital sample processed by the protective device,
FAULT_Ph-$G_1$(n) is a fault type coefficient indicating phase-to-ground faults,
FAULT_Ph-$Ph_1$(n) is a fault type coefficient indicating phase-to-phase fault.

Next gathering all calculated flags $ff_1$, $ff_2$, Internal_Fault an analyze of the reciprocal relationship between the values of these flags and when:

$ff_1$=1 AND Internal_Fault=1 AND $ff_2$=0 AND Internal_Fault=1, it means that fault within protected line circuit #1 has been identified and fault impedance $Z_F$ is calculated in the known way with using the three phase to ground loops and the multi-phase faults loops and additionally if the apparent fault impedance $Z_F$ is outside the relay zone operation characteristic $Z_I$ then a block signal from the protection relay is released,
or
when:

$ff_1$ = 1 AND Internal_Fault= 0 OR
$ff_1$ = 0 AND Internal_Fault= 1 OR
$ff_2$ = 0 AND Internal_Fault= 0 OR
$ff_2$ = 0 and Internal_Fault= 1 OR
$ff_2$ = 1 AND Internal_Fault= 1 OR
$ff_2$ = 1 AND Internal_Fault= 0 OR:
$ff_2$ = 1 AND Internal_Fault= 0, it means that fault outside protected line circuit #1 has been identified and a block signal from the protection relay is generated,
or
when $f_1$=1 AND Internal_Fault=1 AND $ff_2$=0 AND Internal_Fault=1, it means that fault within protected line circuit #1 has been identified and fault impedance $Z_F$ is calculated in the known way with using the three phase to ground loops and the multi-phase faults loops and additionally if the apparent fault impedance $Z_F$ is within the relay zone operation characteristic $Z_I$ then a permission trip signal from the protection relay is released.

Next realising a trip permission signal from the protection relay and sending it to the alarms devices or to the line breakers, or generating a block signal from the protection relay and sending it to the users in order to protect parallel lines.

The essence of computer program for a method of distance protection of parallel transmission lines which is loadable and executable on a data processing unit is that the computer program, when being executed, performs the steps according to claim 1.

The invented method can be used for both series compensated and uncompensated parallel transmission lines and also in case when one of the parallel lines works as a series compensated line and the other one of the parallel lines works as an uncompensated line. The invention achieves accurate and reliable distance measurements for the faulted line. The currents signals are used to avoid incorrect relay operation on the healthy circuit and secured relay operation in the faulty circuit and provides more reliable operation of the distance protection relay.

BRIEF DESCRIPTION OF THE DRAWINGS

The inventive method is presented on the drawing where.

BEST MODE FOR CARRYING OUT THE INVENTION

Figure 1:
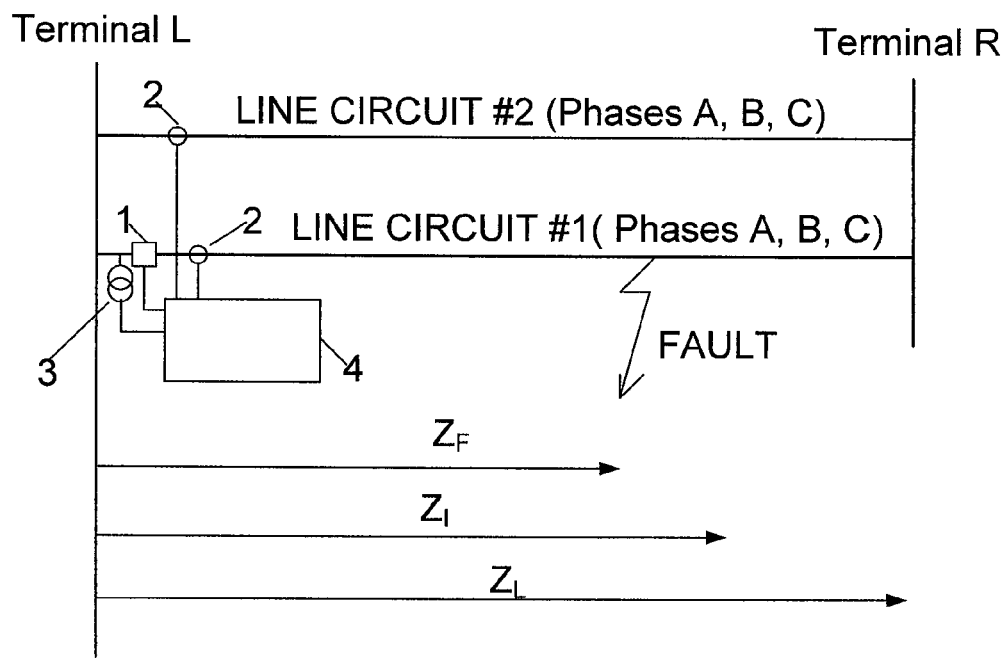
FIG. 1 depicts the general environment in which the present invention is intended to operate.

As shown in FIG. 1 the overall system includes line circuits #1 and #2, which are the lines for three phase A, B, C with terminal L and terminal R, a circuit breaker 1 which is connected to the line circuit #1. A current transformer 2 and a voltage transformer 3 are coupled to a relay 4 in order to obtain current and voltage measurements for the protected line segment having the impedance $Z_L$. On the drawing the protected line segment is the line circuit #1, so the relay 4 is only indicated on this line circuit. Relay 4 is employed to protect three phase A, B, C line circuit #1.

Figure 2:
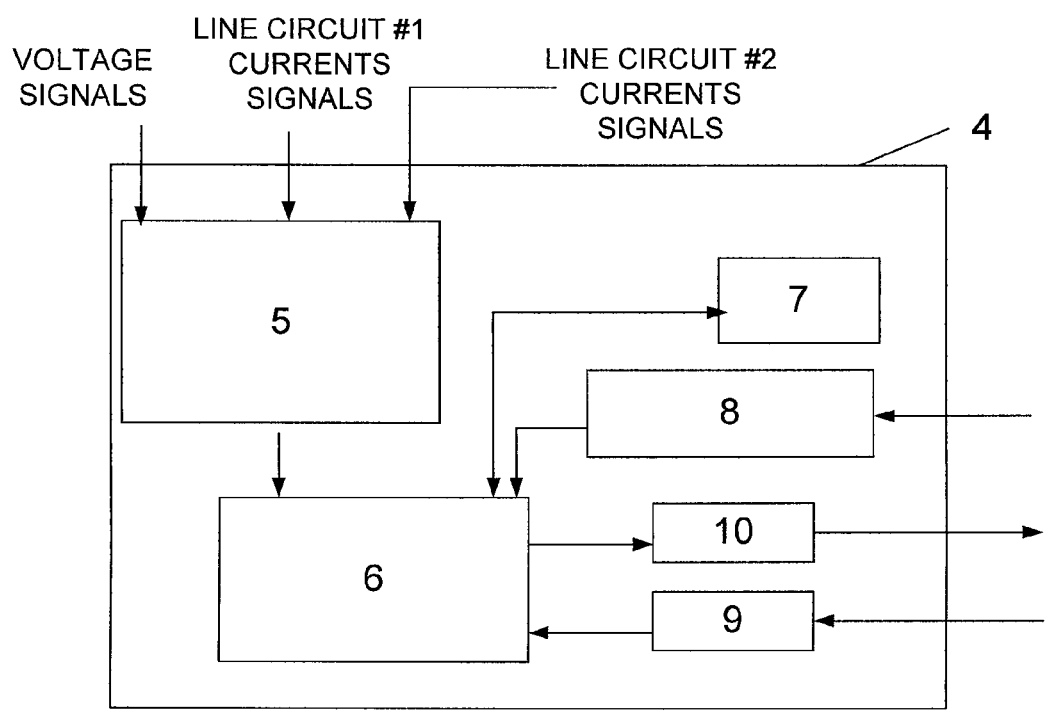
FIG. 2 depicts one presently preferred embodiment of a microprocessor-based protective relay.

As shown in FIG. 2 the relay 4 comprises inputs for current signals from line circuit #1, current signals from line circuit #2 and for voltage signals from the protected line circuits #1. Such signals are sampled and hold in analog-to-digital conversion circuitry 5, which is a part of relay 4, and is connected with a data processing unit 6. The data processing unit 6 it could be a microprocessor and/or digital-signals—processing DSP-based, which is connected with a display and keypad 7, with communication channel(s) 8 for receiving data from other relays (not showing), input contacts 9 for receiving remote binary signals indicating an operation status of circuit breaker 1 or other protecting devices (not shown) and output contacts 10 for sending a trip or block signals. The circuitry 5 and the relay 4 are generally well known. Those skilled in the art will recognize that the output of the analog-to-digital converter circuitry 5 is fed to the data processing unit 6, which employs a cosine filter, Fourier transform, and the like, to produce phasor data for each signals of the measured and sampled lines. The processing unit 6 preferably includes a microprocessor, random access memory RAM, and read only memory ROM, the latter containing program code for controlling the microprocessor in performing fault detection together with fault type determination and fault direction and fault distance determination, fault location, and means for reporting functions, and other protective relaying functions, monitoring and control functions, what is not presented on the drawing. The relay 4 may output fault data to a protection/alarming system, which is not shown, that performs protection and alarming functions such as tripping a circuit breaker or sounding an alarm as appropriate.

Figure 3:
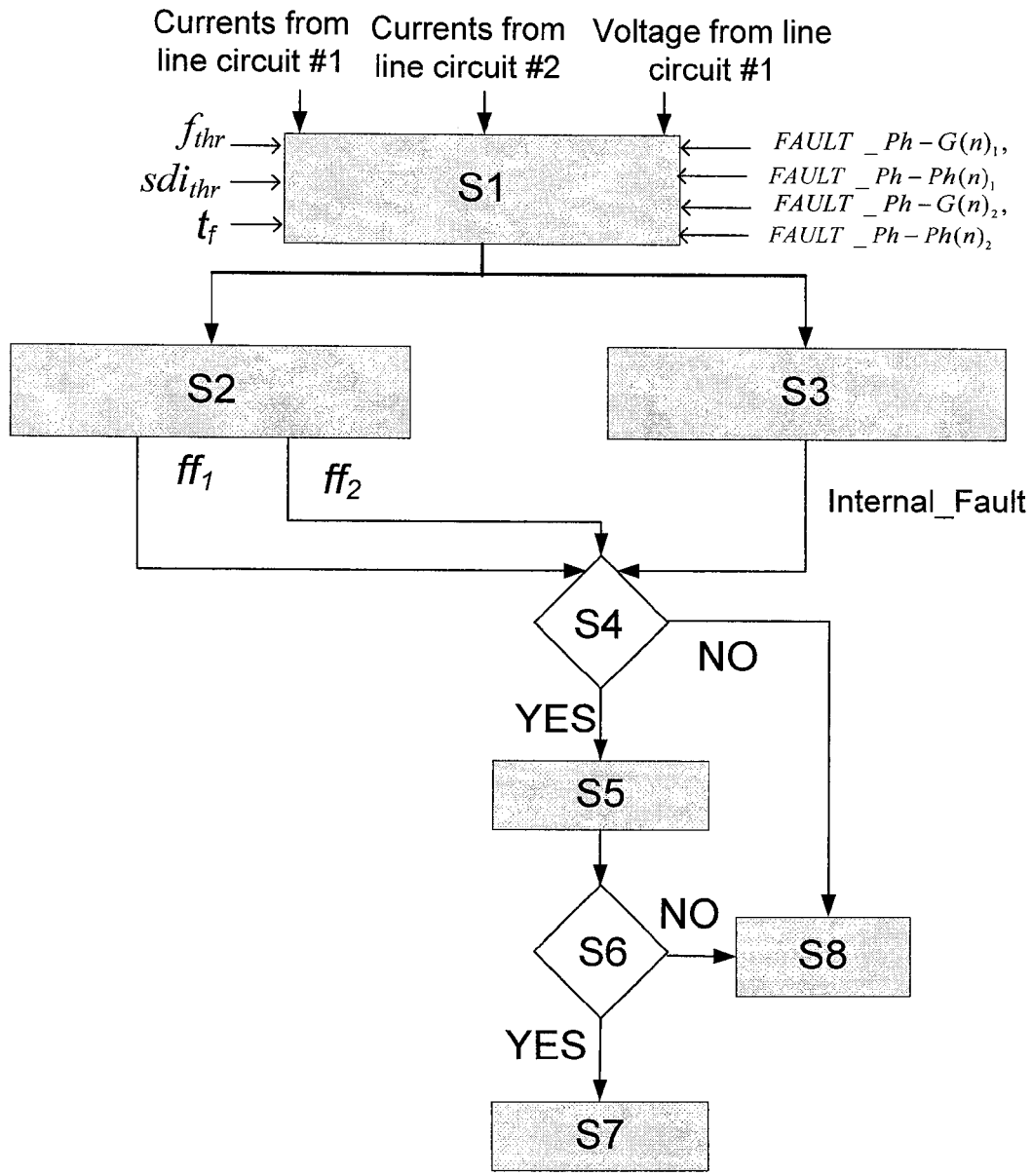
FIG. 3 depicts a set of steps for the realisation of the inventive method.

The methods presented in the flowchart on FIG. 3 use an appropriate currents signals from both parallel lines, circuit: line circuit #1 and line circuit #2 of FIG. 1 and voltage from the protected line circuit #1 in order to achieve high speed parallel lines protection.

Step 1

As shown, the process begins at step S1 where relay 4 samples input current and voltages signals from the individual phases A, B, C from both line circuits #1 and #2 of the parallel lines and optional zero sequence currents of both line circuits #1 and #2 of the parallel lines which were measured in current transformers 2. Next the measured data are converted in an ND converter into digital current signals in conversion circuitry 5.

Additionally a fault type coefficient $FAULT\_Ph\text{-}G_1(n)$ indicating phase-to-ground faults in the line circuit #1, a coefficient $FAULT\_Ph\text{-}Ph_1(n)$ indicating a phase-to-phase fault in the line circuit #1, a coefficient $FAULT\_Ph\text{-}G_2(n)$ indicating phase-to-ground faults and in the line circuit #2, a coefficient $FAULT\_Ph\text{-}Ph_2(n)$ indicating a phase-to-phase fault in the line circuit #2, and a fault detection time $t_F$, are taken from the processing unit 6 for the proper operation of the protection relay 4. Also in this step a different current sum coefficient $sdi_{thr}$ indicating a threshold value and a coefficient $f_{thr}$ which is a threshold for fault coefficient, are delivered to the relay 4 by the user. All of those coefficients are stored in processing unit 6 of the protection relay 4.

If during the operation of the parallel lines, a phase-to-ground fault occurs in line circuit #1, then the coefficient $FAULT\_Ph\text{-}G_1(n)=1$ and the coefficient $FAULT\_Ph\text{-}Ph_1(n)=0$. If during the operation of the parallel lines a phase-to-phase fault occurs in line circuit #1 then the coefficient $FAULT\_Ph\text{-}G_1(n)=0$ and the coefficient $FAULT\_Ph\text{-}Ph_1(n)=1$. When a phase-to-phase-to-ground fault occurs, both $FAULT\_Ph\text{-}G_1(n)$ and $FAULT\_Ph\text{-}Ph_1(n)$ are set to 1. If during the operation of the parallel lines, a phase-to-ground fault occurs in line circuit #2, then the coefficient $FAULT\_Ph\text{-}G_2(n)=1$ and the coefficient $FAULT\_Ph\text{-}Ph_2(n)=0$. If during the operation of the parallel lines a phase-to-phase fault occurs in line circuit #1, then the coefficient $FAULT\_Ph\text{-}G_2(n)=0$ and the coefficient $FAULT\_Ph\text{-}Ph_2(n)=1$. When a phase-to-phase-to-ground fault occurs, both $FAULT\_Ph\text{-}G_2(n)$ and $FAULT\_Ph\text{-}Ph_2(n)$ are set to 1.

Next, in the processing unit 6, the digital current signals from the individual phases A, B, C of both line circuits #1 and #2 of the parallel lines and zero sequences currents are filtered using one of the known methods of half period filtering, for example half-period window Fourier filter method, in order to obtain a phasor values of the digital current signals for each individual phase A, B, C of both line circuits #1 and #2 of the parallel lines. The phasor values of the digital current signals are represented by magnitude and phase angle. Also zero sequences digital currents of both line circuits #1 and #2 of the parallel lines are filtered in order to obtain the phasor values. Alternatively, if the zero sequence currents are not measured, the phasor values of zero sequence digital currents can be calculated from the digital current signals with using of the known methods. Next having the phasor values of digital current signals for each phase A, B, C of the line circuits #1 and #2, the pre-fault current signals and fault current signals are determined by means of one of the known methods.

From the pre-fault current signals for each line circuits #1 and #2, the average values of the tree phase digital current signals magnitude of both line circuits #1 and #2 of the parallel lines are calculated.

After finished all measurements and calculation in the step 1 the next action consist on dividing it into two different actions realized in the same time in step 2 for calculating a pair of flags $ff_1$ and a $ff_2$ and in step 3 for calculating a flag Internal_Fault.

Step 2

In the step S2, which is known from patent application EP11460033.1—the flag $ff_1$ and the $ff_2$ having a conventional value of one or zero is calculated in order to carry out the selection of faulted and healthy line circuits #1 or line circuit #2 in the parallel lines.

The flag $ff_1$ is determined for line circuit #1 according to the following formulas:

$$ff_1(n) \begin{cases} 1 \text{ when} & \begin{cases} f_1(n) \geq f_{thr} \text{ AND FAULT\_Ph}-Ph_1(n)=1 \\ \text{OR} \\ f_{01}(n) \geq f_{thr} \text{ AND FAULT\_Ph}-G_1(n)=1 \end{cases} \\ 0 \text{ otherwise} \end{cases} \quad (1)$$

The flag $ff_2$ is determined for line circuit #2 according to the following formulas:

$$ff_2(n) \begin{cases} 1 & \text{when} & \begin{Bmatrix} f_2(n) \geq f_{thr} \text{ AND FAULT\_Ph}- Ph_2(n) = 1 \\ \text{OR} \\ f_{02}(n) \geq f_{thr} \text{ AND FAULT\_Ph}- G_2(n) = 1 \end{Bmatrix} \\ 0 & \text{otherwise} \end{cases} \quad (2)$$

where:

$f_{thr}$—is a threshold for fault coefficients $f_1$, $f_{01}$, $f_2$, $f_{02}$ given by user, n—is the real consecutive number of the present digital sample processed by the protective device, FAULT_Ph-$G_1$(n) is a fault type coefficient indicating phase-to-ground faults in the line #1, FAULT_Ph-$Ph_1$(n) is a fault type coefficient indicating phase-to-phase fault in the line #1 or non-fault conditions, FAULT_Ph-$G_2$(n) is a fault type coefficient indicating phase-to-ground faults in the line #2, FAULT_Ph-$Ph_2$(n) is a fault type coefficient indicating a phase-to-phase fault in the line #2 or non-fault conditions.

Step 3

In the step 3, which is known from patent application EP11460034.9—the flag Internal_Fault having the conventional value of one for an internal fault within the parallel lines or zero value for an external fault outside the parallel lines is identified, or no fault conditions are determined according to the following formula:

$$\text{Internal\_Fault}(n) = \begin{cases} 1 & \text{when} & \begin{Bmatrix} \frac{\text{sdi\_max}(n)}{\text{sdi\_min}(n)} > sdi_{thr} \text{ AND FAULT\_Ph}- Ph(n) = 1 \\ \text{OR} \\ \frac{\text{sdi\_0max}(n)}{\text{sdi\_0min}(n)} > sdi_{thr} \text{ AND FAULT\_Ph}- G(n) = 1 \end{Bmatrix} \\ 0 & \text{otherwise} \end{cases}$$

where:

$sdi_{thr}$—is a different current sum coefficient threshold given by the user, sdi_max(n), sdi_0max(n)—are maximum values of the sum of the current differences, sdi_min(n), sdi_0min(n)—are minimum values of the sum of the current differences n—is the real consecutive number of the present digital sample processed by the protective device, FAULT_Ph-$G_1$(n) is a fault type coefficient indicating phase-to-ground faults, FAULT_Ph-$Ph_1$(n) is a fault type coefficient indicating phase-to-phase fault.

Step 4

In the step 4 the value of the flag $ff_1$, the flag $ff_2$ and the flag Internal_Fault are analysed in order to identified if the fault occurred in the protected line circuit #1 of the parallel lines, and if the following conditions are fulfilled:

$$ff_1=1 \text{ AND Internal\_Fault}=1 \text{ AND } ff_2=0 \text{ and Internal\_Fault}=1 \quad (4)$$

it means that fault within protected line circuit #1 has been identified and the next step is the step 5, what is illustrated on the FIG. 3 by an arrow with YES caption.

When the other following conditions are fulfilled:

$$\begin{rcases} ff_1 = 1 \text{ AND Internal\_Fault}=0 \text{ OR} \\ ff_1 = 0 \text{ AND Internal\_Fault}=1 \text{ OR} \\ ff_2 = 0 \text{ AND Internal\_Fault}=0 \text{ OR} \\ ff_2 = 0 \text{ and Internal\_Fault}=1 \text{ OR} \\ ff_2 = 1 \text{ AND Internal\_Fault}=1 \text{ OR} \\ ff_2 = 1 \text{ AND Internal\_Fault}=0 \text{ OR:} \\ ff_2 = 1 \text{ AND Internal\_Fault}=0, \end{rcases} \quad (5)$$

it means that fault outside protected line circuit #1 has been identified and the next step is the step 8, what is illustrated on the FIG. 3 by an arrow with NO caption.

Step 5

In the step 5 an apparent fault impedance $Z_F$ is calculated in the known way with using the three phase to ground loops and the multi-phase faults loops.

Step 6

In the step 6 the apparent fault impedance $Z_F$ calculated in the step 5 is checked with respect to specially shaped relay zone operation characteristic $Z_I$ on the impedance plane, not shown in the drawing but know from general knowledge.

If the apparent fault impedance $Z_F$ is within the relay zone operation characteristic $Z_I$, that means that fault occurred in that zone. This is illustrated on the FIG. 3 by the arrow with YES caption and the next step is the step 7.

If the calculated apparent fault impedance $Z_F$ is outside the relay zone operation characteristic $Z_I$, that means that fault occurred outside that zone. This is illustrated on the FIG. 3 by the arrow with NO caption and the next step is the step 8.

Step 7

For the apparent fault impedance $Z_F$ which is within the relay zone operation characteristic $Z_I$ analyzed in the step 6, having the arrow with YES caption in FIG. 3, a trip permission signal from the protection relay 4 is released and sent to the alarms devices or to the line breakers in order to protect parallel lines before damage.

Step 8

After identification the fault outside the protected line circuit #1 in the step 4 or for the apparent fault impedance $Z_F$ which is outside the relay zone operation characteristic $Z_I$ analysed in the step 6, having the arrow with No caption on FIG. 3, a block signal from the protection relay 4 is generated and sent circuit breaker in order to avoid trip in the heavily protected line circuit #1.

The measurements of the parallel circuit currents in conjunction with the measurements of currents on the protected line is utilized to block the incorrect operation in case of the fault outside the protected line. Invented method utilized the two special designed auxiliary methods. One is dedicated to determine whether a detected fault is on the protected line or outside the line and the second one select between faulted and healthy circuits in parallel lines. Due to the applied specific kind of measurements the delivered method is considered to be a simple and important supplementation of the distance relay protection of parallel lines aimed at fast switching-off of the faulty line.

What is claimed is:

1. A method for distance protection of parallel transmission lines comprises:

measuring current and voltages signals from the individual phases (A, B, C) from both line circuit #1 and line circuit #2 of the parallel lines and optional zero sequence currents of both line circuit #1 and line circuit #2 of the parallel lines, processing the measured signals and using a protection relay (4) calculating a coefficient FAULT_Ph-$G_1$(n) which indicates phase-to-ground faults in the line circuit #1, a coefficient FAULT_Ph-$Ph_1$(n) which indicating a phase-to-phase fault in the line circuit #1, a coefficient FAULT_Ph-$G_2$(n) which indicating phase-to-ground faults in the line circuit #2, a coefficient FAULT_Ph-$Ph_2$(n) which indicating a phase-to-phase fault in the line circuit #2, calculating a pair of a flags ($ff_1$, $ff_2$) for indicating faulted and healthy circuits in parallel lines, where the flag ($ff_1$) for line circuit #1 is calculated according to the following formula:

$$ff_1(n) \begin{cases} 1 \text{ when} & \begin{Bmatrix} f_1(n) \geq f_{thr} \text{ AND FAULT\_Ph} - Ph_1(n) = 1 \\ \text{OR} \\ f_{01}(n) \geq f_{thr} \text{ AND FAULT\_Ph} - G_1(n) = 1 \end{Bmatrix} \\ 0 \text{ otherwise} \end{cases}$$

and where the flag ($ff_2$) for line circuit #2 is calculated according to the following formula:

$$ff_2(n) \begin{cases} 1 \text{ when} & \begin{Bmatrix} f_2(n) \geq f_{thr} \text{ AND FAULT\_Ph} - Ph_2(n) = 1 \\ \text{OR} \\ f_{02}(n) \geq f_{thr} \text{ AND FAULT\_Ph} - G_2(n) = 1 \end{Bmatrix} \\ 0 \text{ otherwise} \end{cases}$$

where:

$f_{thr}$—is a threshold for fault coefficients $f_1$, $f_{01}$, $f_2$, $f_{02}$ given by user, n—is the real consecutive number of the present digital sample processed by the protective device, FAULT_Ph-$G_1$(n) is a fault type coefficient indicating phase-to-ground faults in the line #1, FAULT_Ph-$Ph_1$(n) is a fault type coefficient indicating phase-to-phase fault in the line #1 or non-fault conditions, FAULT_Ph-$G_2$(n) is a fault type coefficient indicating phase-to-ground faults in the line #2, FAULT_Ph-$Ph_2$(n) is a fault type coefficient indicating a phase-to-phase fault in the line #2 or non-fault conditions, calculating a flag (Internal_Fault) for indicating internal or external fault in parallel lines in independent way according to the formula:

Internal_Fault(n) =

$$\begin{cases} 1 \text{ when} & \begin{Bmatrix} \frac{sdi\_max(n)}{sdi\_min(n)} > sdi_{thr} \text{ AND FAULT\_Ph} - Ph(n) = 1 \\ \text{OR} \\ \frac{sdi\_0max(n)}{sdi\_0min(n)} > sdi_{thr} \text{ AND FAULT\_Ph} - G(n) = 1 \end{Bmatrix} \\ 0 \text{ otherwise} \end{cases}$$

where:

$sdi_{thr}$—is a different current sum coefficient threshold given by the user, sdi_max(n), sdi_0max(n)—are maximum values of the sum of the current differences, sdi_min(n), sdi_0min(n)—are minimum values of the sum of the current differences, n—is the real consecutive number of the present digital sample processed by the protective device, FAULT_Ph-G(n) is a fault type coefficient indicating phase-to-ground faults, FAULT_Ph-Ph(n) is a fault type coefficient indicating phase-to-phase fault, gathering all calculated flags ($ff_1$, $ff_2$, Internal_Fault) an analyze of the reciprocal relationship between the values of these flags and when:

$ff_1$=1 AND Internal_Fault=1 AND $ff_2$=0 AND Internal_Fault=1, it means that fault within protected line circuit #1 has been identified and fault impedance ($Z_F$) is calculated in the known way with using the three phase to ground loops and the multi-phase faults loops and additionally if the apparent fault impedance ($Z_F$) is outside the relay zone operation characteristic ($Z_I$) then a block signal from the protection relay (4) is released,

OR when:

$$\begin{Bmatrix} ff_1 = 1 \text{ AND Internal\_Fault} = 0 \text{ OR} \\ ff_1 = 0 \text{ AND Internal\_Fault} = 1 \text{ OR} \\ ff_2 = 0 \text{ AND Internal\_Fault} = 0 \text{ OR} \\ ff_2 = 0 \text{ and Internal\_Fault} = 1 \text{ OR} \\ ff_2 = 1 \text{ AND Internal\_Fault} = 1 \text{ OR} \\ ff_2 = 1 \text{ AND Internal\_Fault} = 0 \text{ OR:} \\ ff_2 = 1 \text{ AND Internal\_Fault} = 0, \end{Bmatrix}$$

it means that fault outside protected line circuit #1 has been identified and a block signal from the protection relay 4 is generated,

OR when $ff_1$=1 AND Internal_Fault=1 AND $ff_2$=0 AND Internal_Fault=1, it means that fault within protected line circuit #1 has been identified and fault impedance ($Z_F$) is calculated in the known way with using the three phase to ground loops and the multi-phase faults loops and additionally if the apparent fault impedance ($Z_F$) is within the relay zone operation characteristic ($Z_I$) then a permission trip signal from the protection relay (4) is released, realising a trip permission signal from the protection relay (4) and sending it to the alarms devices or to the line breakers, or generating a block signal from the protection relay (4) and sending it to the users in order to protect parallel lines.

* * * * *